(12) United States Patent
Mitsumoto

(10) Patent No.: US 7,708,894 B2
(45) Date of Patent: May 4, 2010

(54) METHOD OF SUPPLY AMOUNT MANAGEMENT OF WATER TREATING AGENT

(75) Inventor: Hiroyuki Mitsumoto, Matsuyama (JP)

(73) Assignee: Miura Co., Ltd., Matsuyama-shi, Ehime-ken (JP)

( * ) Notice: Subject to any disclaimer, the term of this patent is extended or adjusted under 35 U.S.C. 154(b) by 518 days.

(21) Appl. No.: 11/727,113

(22) Filed: Mar. 23, 2007

(65) Prior Publication Data

US 2007/0227978 A1   Oct. 4, 2007

(30) Foreign Application Priority Data

Mar. 28, 2006 (JP) ............... 2006-086833

(51) Int. Cl.
*C02F 5/12* (2006.01)

(52) U.S. Cl. .............. 210/698; 210/696; 210/739; 436/73; 436/129

(58) Field of Classification Search ............ 210/698
See application file for complete search history.

(56) References Cited

U.S. PATENT DOCUMENTS

| 5,120,661 | A | * | 6/1992 | Baker et al. | 436/164 |
| 5,435,969 | A | * | 7/1995 | Hoots et al. | 422/14 |
| 5,654,198 | A | * | 8/1997 | Carrier et al. | 436/6 |
| 5,736,405 | A | * | 4/1998 | Alfano et al. | 436/55 |
| 5,747,342 | A | * | 5/1998 | Zupanovich | 436/55 |
| 6,153,110 | A | * | 11/2000 | Richardson et al. | 210/739 |

FOREIGN PATENT DOCUMENTS

JP   2003-159597 A   6/2003

* cited by examiner

*Primary Examiner*—Peter A Hruskoci
(74) *Attorney, Agent, or Firm*—Birch, Stewart, Kolasch & Birch, LLP

(57) ABSTRACT

To simply and accurately determine the concentration of a water treating agent in thermal equipment upon management of a supply amount of the water treating agent, a method of controlling a supply amount of a water treating agent according to the present invention includes the steps of: supplying a water treating agent containing a scale inhibitor selected from chelating agents to a water-supply system of thermal equipment; collecting a water sample from the thermal equipment; quantitatively determining the scale inhibitor in the collected water sample; and determining a concentration of the water treating agent in the thermal equipment on the basis of a quantitative value of the scale inhibitor.

11 Claims, No Drawings

METHOD OF SUPPLY AMOUNT MANAGEMENT OF WATER TREATING AGENT

BACKGROUND OF THE INVENTION

1. Field of the Invention

The present invention relates to method of supply amount management of a water treating agent to thermal equipment as represented by a boiler or a cooling tower.

2. Description of the Related Art

In thermal equipment such as a boiler or a cooling tower, for preventing water from causing corrosion or scale formation on a heat-transfer surface, water treating agents have generally been added to water to be supplied. In recent years, in the boiler, water treating agents made of food additives containing silica, an alkaline agent, and a scale inhibitor have been used, as described in JP 2003-159597 A. Here, the silica is blended so that it forms a coating on the heat-transfer surface of the boiler to protect the surface from corrosion by water. In addition, the alkaline agent is typically an alkali metal hydroxide, which is blended for adjusting water to a pH range of 11 to 12 to make the heat-transfer surface difficult to be corroded. Further, the scale inhibitor is a chelating agent, which is capable of forming a complex with any of hardness components (calcium and magnesium ions) each of which is a scale-promoting component, a copper ion, a zinc ion, an iron ion, and the like in water to be supplied. The scale inhibitor is blended for preventing the scale formation on the interface between the heat-transfer substance and the water.

The supply amount of a water treating agent is determined so that the concentration of the water treating agent in the thermal equipment is within a given range on the basis of the quality of water to be supplied and the operating conditions of the thermal equipment (i.e., the concentration rate of the water treating agent in the boiler). This kind of setting is generally performed by a maintainer for the thermal equipment. For exerting the effect of the water treating agent at maximum, it is important to keep the concentration of the water treating agent within a predetermined range. The maintainer should readjust the supply amount of a water treating agent when the concentration of the water treating agent is insufficient or overabundant. The maintainer also should inform a user that the concentration of a water treating agent is within a predetermined range to allow the user to recognize the maintenance conditions and running costs of the thermal equipment. For those reasons, the concentration of a water treating agent in the thermal equipment should be clarified to manage the supply amount of the water treating agent.

For clarifying the concentration of a water treating agent, it will require a great deal of time and efforts to individually determine all of components to be supplied in the water treating agent in a quantitative manner. In addition, to determine a specific component to be supplied in the water treating agent in a quantitative manner, for example, in the case of the water treating agent disclosed in JP 2003-159597 A, there is a problem in that the concentration of the component calculated from the supply amount thereof does not correspond to the actual concentration thereof. This is because silica forms a coating on the heat-transfer surface. Further, an alkali metal hydroxide is generated when an alkaline component such as sodium hydrogen carbonate in water to be supplied is thermally decomposed. Therefore, particularly in the boiler, there is also a problem in that the concentration of the component calculated from the supply amount thereof does not correspond to the actual concentration thereof.

SUMMARY OF THE INVENTION

The present invention has been made in view of the above-mentioned circumstances, and an object of the invention is to provide a method with which a concentration of a water treating agent in thermal equipment can be simply and accurately understood upon management of the supply amount of the water treating agent.

The present invention has been made to attain the above-mentioned object. According to a first aspect of the present invention, a method of supply amount management of a water treating agent includes the steps of: supplying a water treating agent containing a scale inhibitor selected from chelating agents to a water-supply system of thermal equipment; collecting a water sample from the thermal equipment; quantitatively determining the scale inhibitor in the collected water sample; and determining a concentration of the water treating agent in the thermal equipment on the basis of a quantitative value of the scale inhibitor.

According to the first aspect of the present invention, the water treating agent is supplied to a water-supply system of the thermal equipment. Next, the supplied water treating agent is mixed with water to be supplied and then introduced into the thermal equipment. Subsequently, a water sample is collected from the thermal equipment. The collected water sample typically contains the above-mentioned scale inhibitor in free and complexed states. Thus, the scale inhibitor is quantitatively determined using a measuring method that allows the determination of the scale inhibitor in both free and complexed states. Subsequently, depending on the quantitative value of the scale inhibitor, the concentration of the water treating agent in the thermal equipment is specified. Thus, according to such a method, without carrying out the quantitative determination of the respective components of the water treating agent, the concentration of the water treating agent in the thermal equipment can be simply and accurately understood using the scale inhibitor, that is, the chelating agent as an indicator.

According to a method of supply amount management of a water treating agent according to a second aspect of the present invention, in the first aspect of the present invention, the chelating agents are ethylene diamine tetraacetic acid and a salt thereof.

According to the second aspect of the present invention, the concentration of a water treating agent in the thermal equipment can be simply and accurately found using ethylene diamine tetraacetic acid (EDTA) or a salt thereof as an indicator.

According to the present invention, a concentration of a water treating agent in thermal equipment can be simply and accurately understood upon management of the supply amount of the water treating agent. As a result, it is possible to quickly judge whether the supply amount of the water treating agent is suitable, so the maintenance of water treatment can be made efficient.

DETAILED DESCRIPTION OF THE INVENTION

Hereinafter, embodiments of the present invention will be described in detail. The present invention relates to a method of supply amount management of a water treating agent in thermal equipment such as a boiler or a cooling tower, in which the water treating agent to be managed contains a scale inhibitor selected from chelating agents.

The chelating agents are substances each forming a complex with any of hardness components (calcium and magnesium ions) each of which is a scale-promoting component, a copper ion, a zinc ion, an iron ion, and the like in water and being capable of preventing the scale formation on the heat-transfer surface of the thermal equipment. Examples of the chelating agents include organic aminocarboxylic acid-based compounds and tricarboxylic acid-based compounds and inorganic polymerized phosphate-based compounds.

Preferable examples of the aminocarboxylic acid-based compounds include: ethylene diamine tetraacetic acid (EDTA) and a salt thereof; nitrilotriacetic acid (NTA) and a salt thereof; hydroxyethyl ethylene diamine triacetic acid (HEDTA) and a salt thereof; and trans-1,2-diaminocyclohexane tetraacetic acid (CyDTA) and a salt thereof. In addition, preferable examples of the tricarboxylic acid-based compounds include citric acid and a salt thereof. Further, preferable examples of the polymerized phosphate-based compounds include hydroxyethylidene diphosphonic acid (HEDP) and a salt thereof. Among those compounds, alkali metal salts of ethylene diamine tetraacetic acid can be preferably used because they are compounds that do not promote the scale formation on the heat-transfer surface. Further, among the alkali metal salts of ethylene diamine tetraacetic acid, ethylene diamine tetraacetic acid disodium salts can be particularly preferably used because they are compounds that can be safely used as food additives.

In addition, the water treating agent may contain any component except the scale inhibitor. For example, as the water treating agent to be used in the boiler, silica may be added for forming a coating on the heat-transfer surface (e.g., the surface of a water tube) to protect it from corrosion by water. Further, an alkali metal hydroxide may be added for adjusting water to a pH range of 11 to 12 to make the heat-transfer surface difficult to be corroded. When the water treating agent contains such kinds of components, the thermal equipment can not only be prevented from the scale formation but also from corrosion.

In the method of supply amount management of a water treating agent of the present embodiment, the water treating agent is supplied to a water-supply system of the thermal equipment such as a boiler. The water-supply system is a water-supply channel, a water-supply tank, or the like which is connected to the thermal equipment. The water treating agent mixed with water to be supplied is fed to the thermal equipment and then reserved therein.

The supply of the water treating agent is generally carried out using an injector connected with the water-supply system. The injector is mainly provided with a chemical-solution tank in which the water treating agent is reserved and an injection pump. The injection pump is a metering pump capable of discharging a given amount of the water treating agent with respect to a unit volume of water to be supplied. For instance, the injection pump may be one that changes the amount of a liquid to be discharged by adjusting the driving speed and stroke of a piston, diaphragm, or the like that discharges the liquid.

The supply amount of a water treating agent is set on the basis of the water quality of the water to be supplied (e.g., the concentrations of dissolved oxygen and chloride ion that act as corrosion-promoting components and the concentration of a hardness component that acts as a scale-promoting component), the concentration rate thereof in the thermal equipment, and the like. Subsequently, the discharge rate of the injection pump is adjusted so that the set supply amount of the water treating agent can be attained. The water treating agent may be continuously or intermittently supplied to the water-supply system.

Subsequently, part of water reserved in the thermal equipment is collected as a water sample. In general, the collection of the water sample is performed in time with the periodic maintenance of the thermal equipment carried out every several months. The scale inhibitor in the collected water sample is quantitatively determined by a predetermined determination method. The quantification may be carried out on site where the water sample is collected or may be carried out in an analysis facility or the like. The specific quantitative determination method for the scale inhibitor, or the chelating agent will be described later.

In the thermal equipment, the scale inhibitor is being dissolved in water in a free state or in a complex with a scale-promoting component. The water reserved in the thermal equipment is intermittently blown to the outside or periodically provided with water to be supplied so that a given concentration rate can be maintained. Therefore, the scale inhibitor does not exist in an amount exceeding solubility thereof so that the scale inhibitor is free from the possibility of being crystallized in water or being deposited on the heat-transfer surface. In addition, the scale inhibitor is not only thermally stable but also chemically stable under use conditions, so any chemical change or deterioration cannot be caused except the formation of a complex with the scale-promoting component. Further, the scale inhibitor is not a substance naturally present in water to be supplied. From the reasons, the concentration of the scale inhibitor in the thermal equipment correlates with the concentration of the water treating agent in the thermal equipment. Thus, the concentration of the water treating agent can be determined on the basis of the quantitative value of the scale inhibitor and the blending ratio of the scale inhibitor to the water treating agent. In other words, the scale inhibitor plays a role as the so-called tracer for determining the concentration of the water treating agent.

By the way, when the determined concentration of the water treating agent is less than the desired concentration, the water treating agent does not exert sufficient inhibitory effects on scale and corrosion. Thus, the scale formation or corrosion may occur in the thermal equipment. Therefore, it is managed to readjust the discharge rate of the injection pump so that the supply amount of the water treating agent can be increased. In contrast, when the determined concentration of the water treating agent exceeds the desired concentration, the water treating agent is supplied more than required and may cause an increase in running costs if it is neglected. Therefore, for instance, the discharge rate of the injection pump is readjusted so that the supply amount of the water treating agent can be decreased.

Next, the determination method of quantitatively determining the scale inhibitor will be described. To the determination method of quantitatively determining the scale inhibitor, any of titrimetry, colorimetry, high performance liquid chromatography (HPLC), and the like can be applied. In particular, the titrimetry and colorimetry are preferable because of allowing determination with a simple determination kit and a simple determination apparatus on site where the thermal equipment is placed. Hereinafter, those determination methods will be described in detail.

Quantitative Determination of Scale Inhibitor by Titrimetry

First, the quantitative determination of a scale inhibitor by titrimetry will be described. In the titrimetry, first, a test solution is prepared by adding a metal indicator, a pH adjuster, a reducing agent, and a masking agent to a water sample.

The metal indicator is a pigment-based chelating substance which changes its hue when the metal indicator is in an uncomplexed state from that when the metal indicator forms a complex with a metal ion (hereinafter, referred to as a "specific metal ion" for distinguishing from any metal ions in a water sample) supplied from a titrant as described below. When titration is performed on the scale inhibitor provided as a target of quantitative determination, the specific metal ion should be dominantly complexed with the scale inhibitor.

Thus, the metal indicator is selected from chelating substances having smaller constant degrees of stability to the specific metal ion, compared with the scale inhibitor. Those chelating substances include, when the scale inhibitor is an alkali metal salt of ethylene diamine tetraacetic acid, xylenol orange (chemical name: 3,3'-bis[N,N-di(carboxymethyl) aminomethyl]-o-cresol sulfophthalein, disodium salt), methyl thymol blue (chemical name: 3,3'-bis[N,N-di(carboxymethyl)aminomethyl]thymol sulfophthalein, disodium salt), and pyrocatechol violet (chemical name: pyrocatechol sulfophthalein).

An amount of the metal indicator to be added is set to preferably 0.0001 to 0.002 parts by weight, more preferably 0.0005 to 0.001 parts by weight with respect to 100 parts by weight of a water sample. If the amount to be added is less than 0.0001 parts by weight, the test solution is colored pale and it is thus difficult to determine a change in color almost at the end of the titration operation. On the other hand, if the amount to be added exceeds 0.002 parts by weight, the solution under titration is colored dark and it is thus difficult to determine a change in color almost at the end of the titration operation.

The pH adjuster adjusts the pH of the test solution to an acidic region in which the metal indicator subtly changes the color thereof. In general, the pH adjuster may be an acid or a buffer containing an acid and a salt thereof. Here, available acids include: inorganic acids such as nitric acid, hydrochloric acid, and sulfuric acid; and organic acids such as acetic acid. Here, salts of the available acids include alkali metal salts of nitric acid, hydrochloric acid, sulfuric acid, acetic acid, and the like. Any of the acids or the salts thereof may be used in combination of two or more of them.

The amount of the pH adjuster to be added is not limited as far as it allows the pH of a test solution to be in an acidic region. For example, when the metal indicator to be used is xylenol orange or methyl thymol blue, the amount of the pH adjuster is set so that a test solution can be adjusted to a pH of 6 or less, preferably to a pH of 1 to 3 where the test solution is hardly affected by a divalent metal ion and a rare-earth metal ion. If the test solution has a pH of more than 6, the metal indicator may be difficult to have a given hue. By the way, if the water treating agent contains an alkali metal hydroxide, the water sample collected from the thermal equipment has a pH in an alkaline region, so acid in an amount enough to adjust the pH to a neutral or acidic region is preferably used as the pH adjuster.

The reducing agent is used for preventing the metal indicator from changing its color when the metal indicator forms a complex with a multivalent metal ion in the water sample. For example, xylenol orange in an acidic solution is yellow at a pH of 6 or less by changes to blue when it forms a complex with a ferric ion. Therefore, a normal change in hue does not occur during a titration operation, thereby making the quantitative determination of the scale inhibitor impossible. In contrast, when a ferric ion is reduced to a ferrous ion, the quantitative determination of the scale inhibitor is possible since xylenol orange expresses original yellow color. Here, an available reducing agent is selected from reducing substances that reduce a ferric ion to a ferrous ion and do not produce turbidity, precipitation, and coloration in a test solution. Examples of the reducing substances include ascorbic acid and an alkali metal salt thereof, an alkali metal salt of sulfurous acid, an alkali metal salt of bisulfurous acid, and hydroxylamine chloride.

The amount of the reducing agent to be added can be appropriately set without particular limitation as far as it is an amount enough to reduce all of ferric ions in the water sample.

The masking agent is used for enclosing free or complexed ferrous and copper ions in the water sample. Those ferrous and copper ions originated from the water to be supplied, piping materials, or the like are strongly chelated with the scale inhibitor, so they can be hardly replaced with the specific metal ion supplied by the titration operation. Therefore, almost at the end of the titration operation, the hue of the metal indicator, which has changed, returns to its original hue with time, so the end is determined by mistake, or it takes a long period of time to determine the end. In contrast, when the masking agent is added to the water sample in advance, the masking agent dominantly encloses the ferrous and copper ions chelating the scale inhibitor, so the quantitative determination can be accurately performed. Here, the available masking agent has a larger degree of stability to ferrous and copper ions, compared with that of the scale inhibitor. In addition, the masking agent can be selected from chelating substances that do not prevent the distinction of a change in hue of the metal indicator when the metal indicator forms complexes with ferrous and copper ions. Examples of the chelating substances include o-phenanthroline when the scale inhibitor is an alkali metal salt of ethylene diamine tetraacetic acid.

The amount of the masking agent to be added can be appropriately set without particular limitation as far as it is an amount enough to enclose all of ferrous and copper ions in the water sample. For instance, the ferrous and copper ions form a complex with o-phenanthroline at a ratio of 1 to 3, so at least three-fold equivalent amount of the masking agent is added with respect to ferrous and copper ions in the water sample. In contrast, the addition of o-phenanthroline more than a three-fold equivalent amount does not affect a quantitative value of the scale inhibitor but may result in diseconomy. The term "ferrous ion" in a water sample as used herein includes one which is obtained by reducing a ferric ion with the reducing agent.

Next, in the titrimetry, a titration operation is performed on a test solution using a metal salt solution as a titrant. Subsequently, based on the volume of the metal salt solution to be dropped, the concentration of the scale inhibitor in the water sample is determined.

The metal salt solution supplies the specific metal ion into the test solution to allow the specific metal ion to form a complex with the scale inhibitor. The redundant specific metal ion, which could not form a complex with the scale inhibitor, forms a complex with the metal indicator to cause a change in hue of the test solution, thereby concluding that it reaches the end of the titration operation at this moment. Here, an available metal salt solution is not particularly limited as far as it can supply the specific metal ion that can change a hue of the metal indicator to a predetermined hue. For example, a bismuth nitrate solution is preferable when the metal indicator is xylenol orange or methyl thymol blue. Here, the test solution added with xylenol orange is yellow at a pH of 6 or less but changes to red when xylenol orange is complexed with a bismuth ion, thereby, on the basis of such a change in hue, concluding that it reaches the end of the titration operation at this moment. Further, the test solution shows orange color instead of the yellow color when o-phenanthroline which has formed a complex with a ferrous ion in a water sample is coexisted. However, since the test solution changes its color to red when xylenol orange is complexed with a bismuth ion, on the basis of such a change in hue, the end of the titration operation is determined.

Quantitative Determination of Scale Inhibitor by Colorimetry

Next, the quantitative determination of the scale inhibitor by colorimetry will be described. In the colorimetry, first, a test solution is prepared by adding a colorimetric reagent, a metal salt, a pH adjuster, and a reducing agent to a water sample.

The calorimetric reagent is a pigment-based chelating substance which changes its hue when the calorimetric reagent is in an uncomplexed state from that when the calorimetric reagent forms a complex with a metal ion (hereinafter, referred to as a "specific metal ion" for distinguishing from any metal ions in a water sample) supplied from the metal salt described later. When calorimetric determination is performed on the scale inhibitor provided as a target of quantitative determination, the specific metal ion should be dominantly complexed with the scale inhibitor because the concentration of the scale inhibitor is quantitatively determined on the basis of the hue corresponding to an abundance ratio of the complexed state of the calorimetric reagent to the uncomplexed state thereof. Thus, the calorimetric reagent is selected from chelating substances having smaller constant degrees of stability to the specific metal ion, compared with the scale inhibitor. Those chelating substances include, when the scale inhibitor is an alkali metal salt of ethylene diamine tetraacetic acid, xylenol orange (chemical name: 3,3'-bis[N,N-di(carboxymethyl)aminomethyl]-o-cresol sulfophthalein, disodium salt), methyl thymol blue (chemical name: 3,3'-bis [N,N-di(carboxymethyl)aminomethyl]thymol sulfophthalein, disodium salt), and pyrocatechol violet (chemical name: pyrocatechol sulfophthalein).

An amount of the calorimetric reagent to be added is generally set so that the amount of the specific metal ion that can be complexed with the upper limit amount of the scale inhibitor in a water sample is equal to the amount of the specific metal ion that can be complexed with the colorimetric reagent. In other words, are action equivalent amount of the specific metal ion to the upper limit amount of the scale inhibitor to be quantitatively determined is determined in advance and the calorimetric reagent at an amount corresponding to the reaction equivalent amount of the specific metal ion is then added to the water sample. Here, if the amount of the scale inhibitor in a water sample is extremely high, an acute change in hue cannot be obtained when the amount of the calorimetric reagent to be added is directly set depending on the amount of the scale inhibitor in the water sample. Therefore, the accuracy of a spectrophotometer may decrease when the hue of the test solution is determined by the spectrophotometer. For this reason, a water sample is diluted if required and the amount of the calorimetric reagent to be added is then preferably set depending on the amount of the scale inhibitor in the diluted water sample.

The metal salt supplies the specific metal ion into the water sample to allow the specific metal ion to form a complex with the scale inhibitor as well as a complex with the colorimetric reagent. Here, an available metal salt is not particularly limited as far as it can supply the specific metal ion that can form a complex with the calorimetric reagent to change the hue of the colorimetric reagent. For example, bismuth nitrate can preferably be used when the calorimetric reagent is xylenol orange or methyl thymol blue. Here, the xylenol orange in an acidic solution is yellow at a pH of 6 or less but changes to red when it is complexed with a bismuth ion.

The amount of the metal salt to be added is generally set to an amount that can supply the specific metal ion in an amount that allows the specific metal ion to be complexed with a total amount of the colorimetric reagent when the water sample is free of the scale inhibitor. In other words, when the water sample does not contain the scale inhibitor, the total amount of the specific metal ion is complexed with the colorimetric reagent, and the test solution is thus colored with color specific to the complex. On the other hand, when the water sample contains the scale inhibitor, the specific metal ion in an amount that can be coordinated with the scale inhibitor forms a complex with the scale inhibitor. Thus, both the complexed and uncomplexed states coexist in the calorimetric reagent, so the test solution changes its color to a hue corresponding to an abundance ratio of the two.

The pH adjuster adjusts the pH of the test solution to an acidic region in which the metal indicator subtly changes the color thereof. In general, the pH adjuster may be an acid or a buffer containing an acid and a salt thereof. Here, available acids include: inorganic acids such as nitric acid, hydrochloric acid, and sulfuric acid; and organic acids such as acetic acid. Here, salts of the available acids include alkali metal salts of nitric acid, hydrochloric acid, sulfuric acid, acetic acid, and the like. Any of the acids or the salts thereof may be used in combination of two or more of them.

The amount of the pH adjuster to be added is not limited as far as it allows the pH of a test solution to be in an acidic region. For example, when the metal indicator to be used is xylenol orange or methyl thymol blue, the amount of the pH adjuster is set so that a test solution can be adjusted to a pH of 6 or less, preferably to a pH of 1 to 3 where the test solution is hardly affected by a divalent metal ion and a rare-earth metal ion. If the test solution has a pH of more than 6, the metal indicator may be difficult to have a given hue. By the way, if the water treating agent contains an alkali metal hydroxide, the water sample collected from the thermal equipment has a pH in an alkaline region, so acid in an amount enough to adjust the pH to a neutral or acidic region is preferably used as the pH adjuster.

The reducing agent is used for preventing the colorimetric reagent from changing its color when the calorimetric reagent forms a complex with a multivalent metal ion in the water sample. For example, xylene orange in an acidic solution is yellow at a pH of 6 or less but changes to blue when it forms a complex with a ferric ion. Therefore, a normal change in hue does not occur during a titration operation, thereby making the quantitative determination of the scale inhibitor impossible. In contrast, when a ferric ion is reduced to a ferrous ion, the quantitative determination of the scale inhibitor is possible since xylenol orange expresses original yellow color. Here, an available reducing agent is selected from reducing substances that reduce a ferric ion to a ferrous ion and do not produce turbidity, precipitation, and coloration in a test solution. Examples of the reducing substances include ascorbic acid and an alkali metal salt thereof, an alkali metal salt of sulfurous acid, an alkali metal salt of bisulfurous acid, and hydroxylamine chloride.

The amount of the reducing agent to be added can be appropriately set without particular limitation as far as it is an amount enough to reduce all of ferric ions in the water sample.

In an operation for preparing a test solution, it is desirable to heat a water sample or a test solution. In general, ferrous and copper ions originated from water to be supplied, a piping material, or the like are strongly chelated with the scale inhibitor in the water sample, so they can be hardly replaced with the specific metal ion supplied from the metal salt. Thus, when the hue of the test solution is determined using a spectrophotometer, the hue of the calorimetric reagent, which has changed, returns to its original hue with time, so an error is generated in a determination value, or the determination takes a long period of time. Thus, when the water sample or the test solution is heated, the replacement of a ferrous ion to the specific metal ion quickly occurs and the replacement of a copper ion to the specific metal ion also quickly occurs, thereby allowing the quantitative determination to be accurately performed. Here, the term "ferrous ion" in a water sample as used herein includes one which is obtained by reducing a ferric ion with the reducing agent.

The heating of the water sample or test solution is carried out such that, for example, the water sample is heated to a predetermined temperature in advance and then added with the colorimetric reagent, the metal salt, the pH adjuster, and the reducing agent. Alternatively, for example, the water sample may be added with the metal salt, the pH adjuster, and the reducing agent and then heated to a predetermined temperature, followed by addition of the calorimetric reagent. Alternatively, the water sample is added with all of the calorimetric reagent, the metal salt, the pH adjuster, and the reducing agent and the thus-obtained test solution is then heated to a predetermined temperature.

In general, the temperature at which the water sample or test solution is heated is preferably set to 40° C. or more, more preferably 70° C. or more. If the temperature is less than 40° C., the rate of replacement of ferrous and copper ions may be hardly improved. In addition, generally, the duration of heating is preferably set to 8 minutes or more, more preferably 10 minutes or more. If the duration is less than 8 minutes, the total amount of ferrous and copper ions is not replaced with the specific metal ion, so normal hue may be hardly obtained.

Next, in the colorimetry, the hue of a test solution is detected by determining absorbance or transmittance. The concentration of the scale inhibitor in the water sample is determined on the basis of a standard curve that shows the relationship between the concentration of the scale inhibitor and the absorbance or transmittance, which has been prepared in advance.

The absorbance or transmittance of a test solution is generally determined using a spectrophotometer at a wavelength near an absorbance peak of the colorimetric reagent. For instance, xylenol orange has absorbance almost at wavelengths of 305 nm, 436 nm, and 563 nm. At any of those wavelengths, the determination can be carried out. Here, for securing a higher determination accuracy, it is preferable to carry out the determination almost at a wavelength of 563 nm because of a large rate of variation of absorbance or transmittance to the scale inhibitor.

In the determination of the absorbance or transmittance of a test solution, a simplified determination apparatus using commercially available LED and photo-transistor as a light-emitting device and a light-receiving device, respectively, can also be used. In this apparatus, the light-emitting device and the light-receiving device are oppositely placed while sandwiching a determination cell made of a transparent material, which reserves a test solution. Thus, the apparatus is constructed so that the transmission light intensity of light passing through the determination cell is detected by the light-receiving device to determine the absorbance or transmittance. For example, the light-emitting device may be a green LED having a luminous wavelength of 520 to 565 nm. The use of such an apparatus allows the quantitative determination of the scale inhibitor to be carried out on site where the thermal equipment is placed.

As described above, according to the embodiments of the present invention, the concentration of a water treating agent in thermal equipment can be simply and accurately determined upon management of a supply amount of the water treating agent. As a result, it is possible to quickly judge whether the supply amount of the water treating agent is suitable, so maintenance of water treatment can be made efficient.

EXAMPLES

Quantitative Determination Test of EDTA by Titrimetry (Preparation of EDTA-2Na Solution)
A commercially available aqueous disodium ethylene diamine tetraacetic acid (EDTA-2Na) solution (0.01 mol/l) was diluted with distilled water at 1:25, 1:50, 1:75, and 1:150 dilutions to prepare 22.42-mg/l, 44.83-mg/l, 67.25 mg/l, and 134.5-mg/l EDTA-2Na solutions, respectively.

(Preparation of Metal Indicator)
A 0.1% xylenol orange solution was prepared as a metal indicator by dissolving 1 g of xylenol orange in distilled water and adjusting a total volume of the solution to 1 liter.

(Preparation of pH Adjuster)
Nitric acid (60%) was diluted with distilled water to prepare a 10% nitric acid solution as a pH adjuster.

(Preparation of Masking Agent)
One gram of o-phenanthroline was dissolved in 200 ml of ethanol, and the solution was then diluted with distilled water to have a total volume of 1 liter, thereby preparing a 0.1% o-phenanthroline solution as a masking agent.

(Preparation of Metal Salt Solution)
Bismuth nitrate pentahydrate (2.321 g) was dissolved in 10% nitric acid and a total volume of the solution was adjusted to 1 liter, thereby preparing a 1,000-mg/l bismuth nitrate solution as a metal salt solution.

Examples 1 to 4

First, as shown in Table 1, the EDTA-2Na solutions at respective concentrations were each directly used as a water sample. Then, 0.1 g of ascorbic acid as a reducing agent was added to and dissolved in 30 ml of each of the water samples. Then, 400 µl of a 0.1% o-phenanthroline solution was added, 2 ml of a 10% nitric acid solution was added, and 100 µl of a 0.1% xylenol orange solution was added to the solution, thereby preparing each of test solutions. At this time, each test solution showed yellow color. Subsequently, at room temperature, the bismuth nitrate solution was dropped into each test solution to carry out the titration of total EDTA. Here, a point at which the color of the test solution changed to red was set as an end of the titration operation.

Examples 5 to 9

Here, as shown in Table 1, ferric nitrate was added to each of the EDTA-2Na solutions at respective concentrations to prepare water samples each containing 20 mg/l of a ferric ion. In addition, copper nitrate was added to a 67.25-mg/l EDTA-2Na solution to prepare a water sample containing 2 mg/l of a copper ion. Then, 0.1 g of ascorbic acid as a reducing agent was added to and dissolved in 30 ml of each of the water samples. Then, 400 µl of a 0.1% o-phenanthroline solution was added, 2 ml of a 10% nitric acid solution was added, and 100 µl of a 0.1% xylenol orange solution was added to the solution, thereby preparing each of test solutions. At this time, each test solution showed yellow or orange color. Subsequently, a metal salt solution was dropped into each test solution at room temperature to carry out titration of total EDTA. Here, a point, at which the hue of the test solution did not return even after 30 seconds since the color of the test solution changed to red, was set as an end of the titration operation.

(Evaluation)
As is evident from Table 1, in Examples 1 to 4, when the water sample only contained EDTA-2Na, the EDTA-2Na was able to be quantitatively determined with an error of less than ±0.5 mg/l with respect to the prepared concentration thereof. Even in the case where interfering ions such as a ferric or copper ion were contained in the water sample, EDTA-2Na was able to be quantitatively determined with an error of less than ±1.5 mg/l with respect to the prepared concentration thereof. The error was within a practicable range for management of the supply amount of a water treating agent.

TABLE 1

| | Prepared concentration in water sample | | | Titration results of total EDTA | | |
|---|---|---|---|---|---|---|
| | EDTA-2Na (mg/l) | $Fe^{3+}$ (mg/l) | $Cu^{2+}$ (mg/l) | Dropped volume (ml) | Quantitative value (mg/l) | Difference to prepared concentration (mg/l) |
| Example 1 | 22.42 | 0 | 0 | 0.465 | 22.24 | −0.18 |
| Example 2 | 44.83 | 0 | 0 | 0.890 | 44.61 | −0.22 |
| Example 3 | 67.25 | 0 | 0 | 1.321 | 67.29 | +0.04 |
| Example 4 | 134.5 | 0 | 0 | 2.605 | 134.9 | +0.40 |
| Example 5 | 22.42 | 20 | 0 | 0.460 | 21.98 | −0.44 |
| Example 6 | 44.83 | 20 | 0 | 0.915 | 45.93 | +1.09 |
| Example 7 | 67.25 | 20 | 0 | 1.302 | 66.29 | −0.95 |
| Example 8 | 134.5 | 20 | 0 | 2.572 | 133.1 | −1.36 |
| Example 9 | 67.25 | 0 | 20 | 1.300 | 66.19 | −1.06 |

Quantitative Determination Test of EDTA by Colorimetry (Preparation of EDTA-2Na Solution)

A commercially available aqueous disodium ethylene diamine tetraacetic acid (EDTA-2Na) solution (0.01 mol/l) was diluted with distilled water at 1:500, 1:200, 1:100, 1:75, 1:50, 1:40, and 1:33.3 dilutions to prepare 6.7-mg/l, 16.8-mg/l, 33.6-mg/l, 44.8-mg/l, 67.4-mg/l, 84.1-mg/l, and 100.9-mg/l EDTA-2Na solutions, respectively.

(Preparation of Calorimetric Reagent)

A 0.2% xylenol orange solution was prepared as a calorimetric reagent by dissolving 2 g of xylenol orange in distilled water and adjusting a total volume of the solution to 1 liter.

(Preparation of pH Adjuster)

Nitric acid (60%) was diluted with distilled water, thereby preparing a nitric acid solution (pH 1.5) as a pH adjuster.

(Preparation of Reducing Agent)

Ten grams of sodium ascorbate was dissolved in distilled water and a total volume of the solution was adjusted to 1 liter, thereby preparing a 1% sodium ascorbate solution as a reducing agent.

(Preparation of Metal Salt Solution)

Bismuth nitrate pentahydrate (2.321 g) was dissolved in 10% nitric acid and a total volume of the solution was adjusted to 1 liter, thereby preparing a 1,000-mg/l bismuth nitrate solution as a metal salt solution.

Examples 10 to 16

As shown in Table 2, the EDTA-2Na solutions at respective concentrations were each used as a water sample. First, 20 ml of a nitric acid solution was added to 5 ml of each of the water samples for dilution. Then, each solution was added with 0.5 ml of a 0.2% xylenol orange solution, 0.5 ml of a 1% sodium ascorbate solution, and 0.4 ml of a bismuth nitrate solution, thereby preparing each of test solutions. Subsequently, each test solution was heated at 70° C. for 10 minutes, followed by subjecting it to determination of absorbance at wavelengths of 436 nm and 563 nm with a spectrophotometer (U-2010, manufactured by Hitachi, Ltd., quartz cell length: 10 mm).

Example 17

As shown in Table 2, ferric nitrate was added to the 44.8-mg/l EDTA-2Na solution to prepare a water sample containing 10 mg/l of a ferric ion. Subsequently, 5 ml of the water sample was diluted by addition of 20 ml of a nitric acid solution and then added with 0.5 ml of a 0.2% xylenol orange solution, 0.5 ml of a 1% sodium ascorbate solution, and 0.4 ml of a bismuth nitrate solution, thereby preparing a test solution. Subsequently, the test solution was heated at 70° C. for 10 minutes, followed by subjecting it to determination of absorbance at wavelengths of 436 nm and 563 nm with a spectrophotometer (U-2010, manufactured by Hitachi, Ltd., quartz cell length: 10 mm).

Comparative Example

As shown in Table 2, ferric nitrate was added to the 44.8-mg/l EDTA-2Na solution to prepare a water sample containing 10 mg/l of a ferric ion. Subsequently, 5 ml of the water sample was diluted by addition of 20 ml of a nitric acid solution and then added with 0.5 ml of a 0.2% xylenol orange solution, 0.5 ml of a 1% sodium ascorbate solution, and 0.4 ml of a bismuth nitrate solution, thereby preparing a test solution. Subsequently, the test solution was subjected to determination of absorbance at wavelengths of 436 nm and 563 nm with a spectrophotometer (U-2010, manufactured by Hitachi, Ltd., quartz cell length: 10 mm) at room temperature.

(Evaluation)

As is evident from Table 2, in Examples 10 to 16, the absorbance at a wavelength of 436 nm increased as the concentration of EDTA-2Na increased. In contrast, the absorbance at a wavelength of 563 nm decreased as the concentration of EDTA-2Na increased. The relationship between the concentration of EDTA-2Na and the absorbance at a certain wavelength can be used as a so-called standard curve, so the relationship can be applied to water samples of unknown EDTA concentrations. Here, the results revealed that the rate of variation of absorbance to the concentration of EDTA-2Na at a wavelength of 563 nm was larger than that of 436 nm, and the wavelength at 563 nm thus was able to be used for quantitative determination in a more accurate manner than that with the wavelength at 436 nm.

In addition, in Example 17, the absorbance at wavelengths of 436 nm and 563 nm approximately corresponded to that determined in Example 13. Therefore, when the water sample contained a ferric ion and the test solution was heated, it was found that the quantitative determination was able to be carried out accurately without an influence of an interfering ion (i.e., a ferrous ion generated by reduction of a ferric ion). On the other hand, in Comparative Example, the absorbance at a wavelength of 436 nm extensively decreased from the absorbance determined in Example 13, while the absorbance at a wavelength of 563 nm extensively increased from the absorbance determined in Example 13. In Comparative Example, the concentration of EDTA-2Na was about 8 mg/l, which was obtained on the basis of the standard curve prepared from Examples 10 to 16. Therefore, when the water sample contained a ferric ion and the test solution was not heated, it was found that the quantitative determination was not able to be carried out accurately due to an influence of an interfering ion (i.e., a ferrous ion generated by reduction of a ferric ion).

TABLE 2

|  | Prepared concentration in water sample | | Absorbance | |
| --- | --- | --- | --- | --- |
|  | EDTA-2Na (mg/l) | $Fe^{3+}$ (mg/l) | Wavelength at 436 nm | Wavelength at 563 nm |
| Example 10 | 6.7 | 0 | 0.3262 | 2.1367 |
| Example 11 | 16.8 | 0 | 0.3793 | 1.9208 |
| Example 12 | 33.6 | 0 | 0.4931 | 1.5331 |
| Example 13 | 44.8 | 0 | 0.6256 | 1.2620 |
| Example 14 | 67.4 | 0 | 0.7293 | 0.8327 |
| Example 15 | 84.1 | 0 | 0.8626 | 0.5498 |
| Example 16 | 100.9 | 0 | 0.9801 | 0.3126 |
| Example 17 | 44.8 | 10 | 0.5983 | 1.2924 |
| Comparative Example | 44.8 | 10 | 0.3407 | 2.1487 |

What is claimed is:

1. A method of supply amount management of a water treating agent, comprising the steps of:
   supplying a water treating agent containing a scale inhibitor selected from chelating agents to a water-supply system of thermal equipment;
   collecting a water sample from the thermal equipment;
   quantitatively determining the scale inhibitor in the collected water sample by adding metal salt containing a specific metal ion to the sample, and adding a metal indicator or a colorimetric reagent to the sample, wherein the metal salt is added as a solution, wherein
   an effective amount of the metal salt is added to the sample so that the specific metal ion forms a complex with the scale inhibitor in the sample, and with the metal indicator or the colorimetric reagent added to the sample, and
   wherein the metal indicator is added to the sample, and a quantitative value of the scale inhibitor is determined based on the amount of the added metal salt causing the specific metal ion to start forming a complex with the metal indicator, or
   the colorimetric reagent is added to the sample, and the quantitative value of the scale inhibitor is determined based on a detected hue of the sample with the added metal salt and colorimetric reagent;
   determining a concentration of the water treating agent in the thermal equipment on the basis of the quantitative value of the scale inhibitor; and
   adjusting a supply amount of the water treating agent based on the determined concentration.

2. A method according to claim 1, wherein the chelating agents comprise ethylene diamine tetraacetic acid and a salt thereof.

3. A method according to claim 1, wherein the step of quantitatively determining the scale inhibitor includes performing a titration operation on the sample using the metal salt solution as a titrant.

4. A method according to claim 3, wherein as the specific metal ion starts forming a complex with the metal indicator, a hue of the sample changes.

5. A method according to claim 3, wherein the metal indicator is selected from chelating substances having a smaller constant degree of stability to the specific metal ion than the scale inhibitor.

6. A method according to claim 5, wherein the scale inhibitor comprises ethylene diamine tetraacetic acid and a salt thereof, and wherein the metal indicator is selected from the group consisting of: xylenol orange, methyl thymol blue, and pyrocatechol violet.

7. A method according to claim 6, wherein the metal salt solution is a bismuth nitrate solution.

8. A method according to claim 1, wherein the colorimetric reagent is added to the sample as part of the step of quantitatively determining the scale inhibitor, and the hue of the sample with the added metal salt and the added colorimetric reagent is determined by a spectrophotometer.

9. A method according to claim 8, wherein the amount of the colorimetric reagent added to the sample is coordinated with the amount of the metal salt added to the sample, such that a ratio of the amount of added colorimetric reagent in a complex with the specific metal ion to the amount of the added colorimetric reagent in an uncomplexed state is determinative of the quantitative value of the scale inhibitor.

10. A method according to claim 8, wherein the scale inhibitor comprises ethylene diamine tetraacetic acid and a salt thereof, and wherein the colorimetric reagent is selected from the group consisting of: xylenol orange, methyl thymol blue, and pyrocatechol violet.

11. A method according to claim 10, wherein the metal salt is bismuth nitrate.

* * * * *